(12) United States Patent
Morin et al.

(10) Patent No.: US 9,411,800 B2
(45) Date of Patent: Aug. 9, 2016

(54) ADAPTIVE GENERATION OF OUT-OF-DICTIONARY PERSONALIZED LONG WORDS

(75) Inventors: Frederic Morin, Redmond, WA (US); Wei Yu, Sammamish, WA (US); F. James Eisenhart, Seattle, WA (US); Qi Zhang, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1746 days.

(21) Appl. No.: 12/163,082

(22) Filed: Jun. 27, 2008

(65) Prior Publication Data

US 2009/0326927 A1    Dec. 31, 2009

(51) Int. Cl.
*G06F 17/21* (2006.01)
*G06F 17/27* (2006.01)

(52) U.S. Cl.
CPC ................................ *G06F 17/276* (2013.01)

(58) Field of Classification Search
CPC ........................... G10L 15/065; G10L 15/197
USPC .............................................................. 704/9
See application file for complete search history.

(56) References Cited

U.S. PATENT DOCUMENTS

| | | | |
|---|---|---|---|
| 5,510,981 A | 4/1996 | Berger et al. | |
| 6,084,985 A | 7/2000 | Dolfing et al. | |
| 6,904,402 B1 | 6/2005 | Wang et al. | |
| 7,275,029 B1 | 9/2007 | Gao et al. | |
| 2002/0046018 A1* | 4/2002 | Marcu et al. | 704/9 |
| 2005/0071148 A1 | 3/2005 | Huang et al. | |
| 2005/0114770 A1 | 5/2005 | Sacher et al. | |
| 2005/0209844 A1 | 9/2005 | Wu et al. | |
| 2005/0240566 A1* | 10/2005 | Kurzweil et al. | 707/1 |
| 2006/0015326 A1 | 1/2006 | Mori et al. | |
| 2006/0206313 A1 | 9/2006 | Xu et al. | |
| 2007/0112555 A1* | 5/2007 | Lavi et al. | 704/9 |
| 2008/0130699 A1* | 6/2008 | Ma et al. | 372/50.12 |
| 2008/0154581 A1* | 6/2008 | Lavi et al. | 704/9 |
| 2009/0248669 A1* | 10/2009 | Shetti et al. | 707/5 |
| 2010/0211378 A1* | 8/2010 | Bulyko | 704/9 |
| 2011/0106523 A1* | 5/2011 | Maeda et al. | 704/2 |

OTHER PUBLICATIONS

George Saon et al., "Data-Driven Approach to Designing Compound Words for Continuous Speech Recognition", 2001, IEEE, pp. 327-322.*

Marco Baroni et al., "Wordform- and class-based prediction of the components of German nominal compounds in an AAC system", 2002, pp. 1-7.*

(Continued)

*Primary Examiner* — Douglas Godbold
*Assistant Examiner* — Mark Villena
(74) *Attorney, Agent, or Firm* — Timothy Churna; Judy Yee; Micky Minhas

(57) ABSTRACT

A system is provided, including a display unit, a memory unit, and a processor. The processor is configured to calculate a mutual information value between a first chunk and a second chunk, and to add a new word to a language unit when a condition involving the mutual information value is satisfied. The new word is a combination of the first chunk and the second chunk. The processor is also configured to add the new word into an n-gram store. The n-gram store includes a plurality of n-grams and associated frequency or count information. The processor is also configured to alter the frequency or count information based on the new word.

23 Claims, 9 Drawing Sheets

(56) References Cited

OTHER PUBLICATIONS

Rohini K. Srihari et al., "Use of Language Models in Handwriting Recognition", Jun. 2007, pp. 1-38.*

Sven Martin et al., "Algorithms for bigram and trigram word clustering", 1998, Elsevier Science B.V., pp. 19-37.*

Creutz, et al., "Unsupervised Discovery of Morphemes", Proceedings of the ACL-02 Workshop on Morphological and Phonological Learning, vol. 6, Annual Meeting of the ACL, 2002, pp. 11.

El-Qawasmeh, "Word Prediction Using a Clustered Optimal Binary Search Tree", Information Processing Letters, vol. 92, Issue 5, Dec. 2004, Elsevier B.V., pp. 257-265.

Bramsen, "Tweaking the Segmentation of Chinese Text to Improve Language Model Perplexity", Sep. 17 2004, MIT, pp. 12.

Teahan, et al., "Text Classification and Segmentation Using Minimum Cross-Entropy", In International Conference on Content-Based Multimedia Information Access (RIAO), 2000, pp. 19.

Gao, et al., "Chinese Word Segmentation and Named Entity Recognition: A Pragmatic Approach", vol. 31, No. 4, Accepted for Publication: Jun. 17, 2005, Association for Computational Linguistics, pp. 531-574.

Gao, et al., "Toward a Unified Approach to Statistical Language Modeling for Chinese", ACM Transactions on Asian Language Information Processing, vol. 1, No. 1, Mar. 2002, ACM, 2002, pp. 3-33.

Chien, et al., "PAT-Tree-Based Keyword Extraction for Chinese Information Retrieval", SIGIR'97, ACM, 1997, pp. 50-58.

* cited by examiner

ADAPTIVE GENERATION OF OUT-OF-DICTIONARY PERSONALIZED LONG WORDS

TECHNICAL FIELD

This description relates generally to pattern or word recognition and prediction and more specifically to adaptive generation of out-of-dictionary personalized long words.

BACKGROUND

A user may generate content that is frequently occurring for that user, but rare or unknown for most other users. As a result, it is unlikely a standardized dictionary, language model or other user content analyzing component includes such user-specific content. As a result, text entry prediction, handwriting recognition or spelling and grammar checkers may perform in a suboptimal manner as applied to that user.

SUMMARY

The following presents a simplified summary of the disclosure in order to provide a basic understanding to the reader. This summary is not an extensive overview of the disclosure and it does not identify key/critical elements of all embodiments or delineate the scope of all embodiments. Its sole purpose is to present some concepts disclosed herein in a simplified form as a prelude to the more detailed description that is presented later.

In various embodiments, a computer program product, a system and/or a method for adapting a language unit is provided. The language unit maintains a language model, which can be used to improve text prediction, handwriting recognition, spelling and grammar checkers, new language (including human languages, codes, whale songs, bee dances or any other type of language) acquisition systems or any other suitable language-influenced systems.

In one embodiment, a computer program product includes a computer usable medium having computer readable program code embodied therein configured to adapt a language unit. The computer program product also includes computer readable code configured to cause a computer to calculate a mutual information value between a first chunk and a second chunk and computer readable code configured to cause the computer to add a new word to the language unit when a condition involving the mutual information value is satisfied.

The new word is a combination of the first chunk and the second chunk. The chunks can be generated by a segmentation unit that breaks content into segments. The computer readable code configured to cause the computer to add the new word includes computer readable code configured to cause the computer to add the new word into an n-gram store. The n-gram store includes a plurality of n-grams and associated frequency or count information. An n-gram is a group of n segments, chunks, words or any other suitable unit. An n-gram can also be associated with statistical information. A bigram is an n-gram where n is 2. The first word, segment, chunk or other unit of a bigram is referred to herein as a leading word. The second word, segment, chunk or other unit of a bigram is referred to herein as a trailing word.

The computer readable code configured to cause the computer to add the new word also includes computer readable code configured to cause the computer to alter the frequency or count information based on the new word. For example, when a new word and associated bigrams are added to an n-gram store, some amount of count from some of the existing bigrams and words can be transferred to the new word and bigrams.

In one embodiment, each of the plurality of n-grams are bigrams. In still another embodiment, the computer readable code configured to cause the computer to add the new word into the n-gram store includes computer readable code configured to cause the computer to associate a first count with the new word and computer readable code configured to cause the computer to associate a second count with the first chunk. The second count is a count associated with the first chunk minus the first count. As a result, some amount of count is transferred from an existing word to the new word.

In another embodiment, the computer readable code configured to cause the computer to alter the frequency or count information based on the new word includes computer readable code configured to cause the computer to determine a set of bigrams. Each member of the set of bigrams includes the first chunk as a trailing word.

The computer readable code configured to cause the computer to alter the frequency or count information based on the new word also includes computer readable code configured to cause the computer to compute a delta value for each member of the set of bigrams. The delta value is a first count minus a second count. The first count is associated with the member of the set for which the delta value is being calculated. The second count is a third count minus a fourth count. The third count is associated with the first chunk. The fourth count is associated with a first bigram. The first bigram includes the first chunk as a leading word and the second chunk. In other words, it is the bigram that is being condensed into a new word.

The computer readable code configured to cause the computer to alter the frequency or count information based on the new word also includes computer readable code configured to cause the computer, when the delta value calculated for the set member is positive, to associate a fifth count with the first member and to associate a sixth count with a new bigram. The new bigram has the same leading word as the first member. The new bigram also has the new word. The fifth count is the count associated with the bigram associated with the delta value minus the delta value plus a proportional adjustment. The proportional adjustment is the multiplicative inverse of the third count multiplied by the delta value multiplied by the difference between the third count and the fourth count. The sixth count is the delta value multiplied by the difference between one and the proportional adjustment. As a result, some amount of count may be redistributed from bigrams having the same trailing word as the first chunk that's becoming part of the new word to bigrams having the new word as the trailing word.

In another embodiment, the computer readable code configured to cause the computer to alter the frequency or count information based on the new word includes computer readable code configured to cause the computer to determine another set of bigrams. Each member of the set includes the second chunk as a leading word.

The computer readable code configured to cause the computer to alter the frequency or count information based on the new word also includes computer readable code configured to cause the computer to compute another delta value for each member of the set. The delta value is a first count minus a second count. The first count is associated with a first bigram. The first bigram includes the first chunk as a leading word. The first bigram also includes the second chunk. In other words, the first bigram is the bigram being collapsed into the new word. The second count is a third count minus a fourth count. The third count is associated with the second chunk. The fourth count is associated with the member of the set for which the delta value was calculated.

The computer readable code configured to cause the computer to alter the frequency or count information based on the new word also includes computer readable code configured to cause the computer, when the delta value calculated for the set member is positive, to associate a fifth count with the first member and to associate a sixth count with a new bigram. The new bigram has a same trailing word as the first member. The new bigram also has the new word. The fifth count is the first count minus the delta value plus a proportional adjustment. The proportional adjustment is the delta value multiplied by the first count multiplied by the multiplicative inverse of the sum of first count and the third count. The sixth count is the delta value multiplied by the difference between one and the proportional adjustment. As a result, some amount of count may be redistributed from bigrams having the same leading word as the second chunk that's becoming part of the new word to bigrams having the new word as the leading word.

In one embodiment, the condition under which a new word is added includes the mutual information value being greater than a first threshold value and a count associated with a bigram including the first chunk and the second chunk being greater than a second threshold value.

In still another embodiment, the computer program product also includes computer readable code configured to cause the computer to receive an input value and computer readable code configured to determine at least one predicted word from the input value, a first n-gram of the plurality of n-grams and the frequency or count information associated with the first n-gram. The computer program product also includes computer readable code configured to display at least one predicted word. As a result, predictions of what the user is attempting to input can be presented to the user, to enable more efficient content entry.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
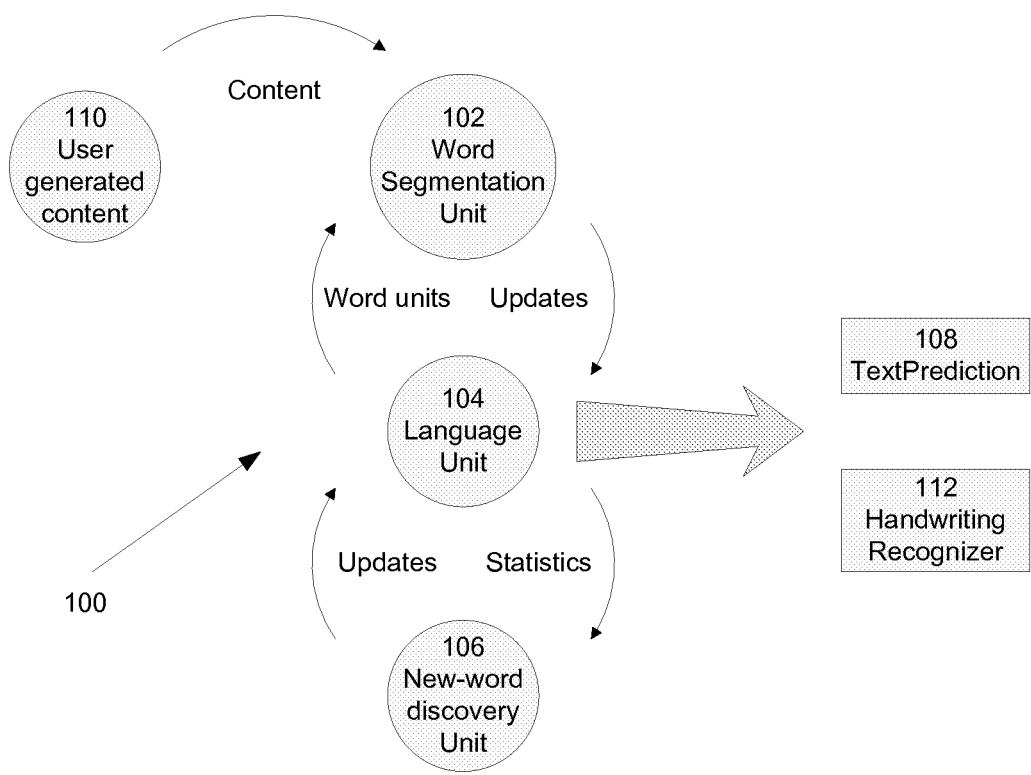
FIG. 1 is a block diagram of a system for generating new words in accordance with one embodiment.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a general purpose computer system, the system described is provided as an example and not a limitation. As those skilled in the art will appreciate, the present examples are suitable for application in a variety of different types of systems.

In most East Asian languages, like Chinese, the concept of words is not clear, and detecting new and significant words is useful in building efficient language units or models for word prediction, handwriting interpretation, error correction or other specific word identifying applications. In various embodiments, language units or models are built from base units such as words. However, it should be understood that language models can be built from other base units or combinations of base units, such as characters, symbols, marks, sounds, temporal encodings, phrases or any other suitable visibly, audibly and/or temporally arranged information encoding units.

In various embodiments, efficient and reliable language units can be leveraged to provide improved accuracy for a number of applications, such as handwriting recognition and text prediction. Language units can be based on a large text corpus as well as user-specific text, leading to improved accuracy in matching the user's expectations. High-frequency words can be provided in a static lexicon, but words generated from user content have an important (and frequently immediate) impact on the user experience. For example, words in a technical area, such as chemistry or medicine, can be difficult to efficiently include in a static lexicon. However, such words can be added to a dynamic word store in various embodiments.

In one embodiment, an initial language unit is trained from user generated content by keeping track of all possible segmentation candidates (e.g., words). This extended language unit has the predictive ability to discover and rate potential new words and add them to the system, therefore enabling novel (and possibly more suitable) segmentations when new user content is provided. Such new segmentations can be reinforced by later user content, thus improving the revised language unit and its predictive ability (e.g., with respect to text prediction). It should be understood that in various embodiments, user generated content can include content entered by the user with any suitable input device, web pages visited by the user, e-mail or other transmissions delivered to the user, or any other suitable information source. Further, it should be understood that in various embodiments, less than all of the possible segmentation candidates are tracked.

Various embodiments include automatic new word discovery from user-generated content, iterative (progressive) improvement of the language unit from the user-generated content, efficient updating and maintenance of an evolving language unit, improved accuracy for text prediction leading to faster input entry, and/or improved accuracy for handwriting recognition.

FIG. 1 illustrates a system for generating new words in accordance with one embodiment. The system 100 includes a word-segmentation unit 102, a language unit 104 and a new word discovery unit 106. The language unit 104 can provide a language model or information based on a language model to a text prediction system 108 (such as TextPrediction or any other suitable application) or a handwriting recognition system 112 to improve the effectiveness and accuracy of its predictions in a manner customized to the user. The word segmentation unit breaks a sequence of letters, such as content 110 provided by the user, into a sequence of words. It should be understood that letters can be alpha-numeric letters, characters, symbols, marks, sounds, temporal encodings, phrases or any other suitable visibly, audibly and/or temporally arranged information encoding units. Further, it should be understood that words can be English, Chinese, Korean, Japanese, Russian, Spanish, French, Arabic, Farsi, Greek or any other spoken or written language words or any other suitable arrangement or configuration of letters.

In one embodiment, the word segmentation unit 102 utilizes information about the current language model maintained by the language unit 104 to extract possible segmentation candidates. The language unit 104 can then be updated from the segmentations extracted from the user content 110, accumulating statistical information about the relationship between words (even relationships that are not apparent upon casual observation).

The new word discovery unit 106 uses language model information provided by the language unit 104 to compute statistical measures and discover meaningful words. The language model of the language unit 104 is then updated with those new words (along with derived statistics). As a result, new words can affect the performance of the segmentation unit 102 and can tune the language unit for improved accuracy.

In various embodiments, new words can be detected as soon as new user-generated content is provided, enabling fast-updating of the language unit. The system can then take advantage of the updated language unit to improve the user experience. The language unit does not need to be retrained on the previously seen user-generated content; however, retraining on previously seen user-generated content can occur in various embodiments. In another embodiment, the language unit is updated (and improved) gradually as new data becomes available.

In one embodiment, a user-generated sentence (e.g., a sequence of letters) is broken into chunks by the IWordBreaker algorithm, Office WordBreaker, or any other suitable segmentation algorithm. The result is a sequence of chunks. Because IWordBreaker tends to over-segment, chunks are usually smaller than words. To address this issue, chunks are recombined into potential words.

In one embodiment, given a sequence of letters (e.g., from user's typing, writing, received e-mails, visited web pages, voice mail messages, speech, drawing, or any other suitable input mechanism), a sequence of chunks $c_1, c_2, \ldots, c_n$ is produced. For each chunk position i, the system generates the words $c_i, c_i c_{i+1}, c_i c_{i+1} c_{i+2}$ and $c_i c_{i+1} c_{i+2} c_{i+3}$ and adds contributions to the language model of the language unit. In one embodiment, word length is fixed to 4 chunks as a heuristic for the Chinese language; however, word length can be any length L in various other embodiments. In this embodiment, the recombination of chunks into words is limited to a length of 4 chunks because few words will require more than that. For example, most idioms in this embodiment are composed of 4 characters. It should be noted that the idioms of length 4 of this embodiment are Chinese idioms, and the chunks segmented from user-generated Chinese language content. However, words or idioms can be formed from any suitable number of chunks segmented from any suitable content in any suitable language in various other embodiments.

In another embodiment, the language unit is improved by the addition of a lexicon. In this embodiment, a user-generated sentence is broken into chunks giving rise to the sequence $c_1, c_2, \ldots, c_n$. A large static lexicon is used to determine if any of the potential words $c_i, c_i c_{i+1}, c_i c_{i+1} c_{i+2}, \ldots, c_i c_{i+1} \ldots c_{i+m}$ at chunk position i is suitable to be used to update the language model (e.g., to be added to a dynamic lexicon or to have statistics associated with the potential word modified). If there is more than one matching word, there can be different segmentations. If no words can be found in the lexicon, then $c_i$ is used as the potential word and the point of segmentation. The segmentations are tracked (when there is more than one) and used to update the language unit.

In an exemplary embodiment, a system improves the language unit using probabilistic word segmentation. In this embodiment, the set of segmentations can be the same as in the embodiment described above. However, the update to the language unit is determined from the current state of the language unit. In other words, each segmentation carries a different weight. The weight is computed from the language model stored by the language unit, and the weight is used to update the language model. For example, the same sequence of letters might have been segmented into two different word sequences: $S_1 = w_1 w_2$ and $S_2 = w_3 w_4$. From the language model, the system can compute the likelihood of these two sequences and assign an update value proportional to this likelihood. Such proportional updating is valid for unigrams and n-grams in general.

In another embodiment, a system improves the language unit using word aggregation. From the language model, the system computes statistical quantities between two words. For example, the system computes the probability $p(w_1, w_2)$ of seeing the words $w_1$ followed by $w_2$. Given a sequence $w_1 w_2$, the system determines if a single word $w_3 = w_1 w_2$ would be relevant and should be added to the language model. To make this determination, in one embodiment, the system computes 3 quantities: the sum of the mutual informations between any pair $(x, w_1)$, the mutual information between $(w_1, w_2)$, and the sum of the mutual informations between any pair $(w_2, y)$.

In one embodiment, the system then uses a classification algorithm (e.g., a neural network) to decide from the input (e.g., the 3 quantities described above) if the pair of word is a candidate for combination into one new word. Other embodiments utilize other classification algorithms like a decision-tree (set of thresholds) or any other suitable algorithms for determining that a new word should be created or recognized.

In one embodiment, after a new word is found, the language unit is updated. All n-grams for $(w_1, w_2, x, \ldots)$ are updated to reflect the new word and n-gram (i.e., the n-gram for $(w_1 w_2, x, \ldots)$). Similarly, the bigram for $(w_1, w_2)$ is used to update the unigram $(w_1 w_2)$. The new word is then readily usable and can be used and/or predicted by applications like TextPrediction.

In various embodiments, a system determines the likelihood of a segmentation using the language unit. The likelihood of a word-sequence $S = w_1 w_2 w_3 w_4$ is $\angle(S) = P(w_1) P(w_2|w_1) P(w_3|w_1, w_2) P(w_4|w_1, w_2, w_3)$, where $P(w_1)$ is the probability of $w_1$ occurring, $P(w_2|w_1)$ is the probability of $w_2$ occurring given that $w_1$ occurred, $P(w_3|w_1,w_2)$ is the probably of $w_3$ occurring given that $w_1$ and $w_2$ occurred, and $P(w_4|w_1,w_2,w_3)$ is the probability of $w_4$ occurring given that $w_1$, $w_2$ and $w_3$ occurred. The probabilities (or their approximations) are provided by the language unit. In one embodiment, the likelihood can be modified using a bias term to favor sequences with longer words. For example, the likelihood can be given by:

$$L(S) = \prod_i \{P(w_i | \ldots , w_{i-2}, w_{i-1}) + b\}$$

In one embodiment, a system maintains a short-term n-gram store. N-grams are harvested from user-generated content or any other suitable content sources and stored in the short-term n-gram store. In one embodiment, bigrams (w1, w2) are harvested and stored in a separate trie from the n-gram store, but with the same word mapping (e.g., the node numbers from the harvested general wordlist). The total count of bigrams can be limited by a constant C. The total count in this embodiment is not the number of different bigrams. Instead, the total count is the total sum of frequencies (or counts) recorded. In one embodiment, the system scales the counts by a constant S. As a result, each new bigrams (with count 1) will contribute a scaled count of 1*S to the total count.

In one embodiment, when the total number of scaled counts goes above S*C, the system rescales the counts. Some results of this rescaling operation is to make room for new bigrams and to gradually diminish the contribution of older bigrams. The amount, $\Delta$, by which the size threshold, S*C, is exceeded can be calculated by $$\Delta = \sum_i f_i - S*C,$$

where $f_i$ are the scaled counts stored in the trie. In one embodiment, the system scales down the $f_i$ so that $$\sum_i f_i = \alpha * S * C,$$

where alpha is any suitable constant (e.g., 0.9). Alpha can be chosen such that the system is not caused to rescale frequently (e.g., every time a new bigram is inserted). In one embodiment, the system removes all entries with $\lfloor f_i \rfloor = 0$ (i.e., where the floor of $f_i$ is 0). It should be noted that in this embodiment, counts are stored as integers, however counts can be stored as any other type (e.g., reals, floating points, etc.). It should also be noted that the conditions for removing entries can be any suitable conditions in various other embodiments. For example, in one embodiment, the system removes all entries with $f_i < \epsilon$, where $\epsilon$ is any suitable value, such as 0.5.

In one embodiment, a system is provided, including a display unit, a memory unit, and a processor. The processor is configured to calculate a mutual information value between a first chunk and a second chunk, and to add a new word to a language unit when a condition involving the mutual information value is satisfied. The new word is a combination of the first chunk and the second chunk. The processor is also configured to add the new word into an n-gram store. The n-gram store includes a plurality of n-grams and associated frequency or count information. The processor is also configured to alter the frequency or count information based on the new word.

In one embodiment, the system can detect new words in the short-term n-gram store as illustrated by the following example. In the example, the system harvests three strings containing the following words from the user lexicon: a, b, c, d, e and f. It should be understood that the strings can be harvested from any suitable content, including user-generated content. It should also be understood that the words can be any suitable words, characters, symbols, marks, sounds, temporal encodings, phrases or any other suitable visibly, audibly and/or temporally arranged information encoding units. In this example, the three strings, S1, S2, and S3, are as follows:

S1=a b c d e f
S2=a c d b f e
S3=f d e b c a

Figure 2:
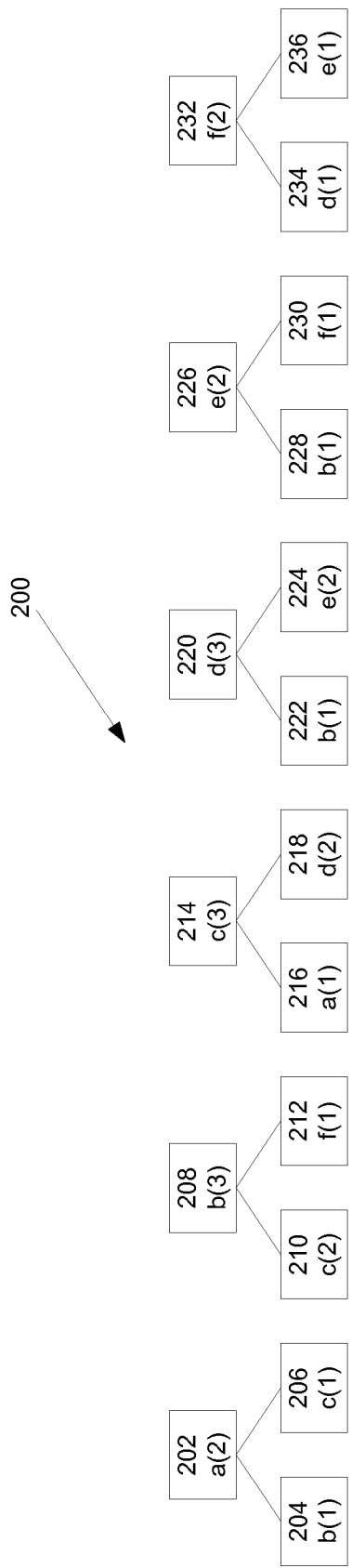
FIG. 2 is a block diagram of a trie of a short-term n-gram store containing bigrams in accordance with one embodiment.

FIG. 2 illustrates a trie of the short-term n-gram store containing the bigrams for the example. Block 202 shows the word "a" being associated with a count of 2, indicating that initially "a" is the leading word of two bigrams in the n-gram store. Block 204 shows that the word "b" is the trailing word of a bigram, (a,b), associated with a count of 1, indicating that initially the bigram (a,b) appears once in the content being analyzed. Similarly, block 206 shows that the word "c" is the trailing word of a bigram, (a,c), associated with a count of 1, indicating that initially the bigram (a,c) appears once in the content being analyzed.

Similarly, block 208 shows the word "b" being associated with a count of 3, indicating that initially "b" is the leading word of three bigrams in the n-gram store. Block 210 shows that the word "c" is the trailing word of a bigram, (b,c), associated with a count of 2, indicating that initially the bigram (b,c) appears twice in the content being analyzed. Block 212 shows that the word "f" is the trailing word of a bigram, (b,f), associated with a count of 1. Block 214 shows the word "c" being associated with a count of 3. Block 216 shows that the word "a" is the trailing word of a bigram, (c,a), associated with a count of 1. Block 218 shows that the word "d" is the trailing word of a bigram, (c,d), associated with a count of 2.

Block 220 shows the word "d" being associated with a count of 3. Block 222 shows that the word "b" is the trailing word of a bigram, (d,b), associated with a count of 1. Block 224 shows that the word "e" is the trailing word of a bigram, (d,e), associated with a count of 2. Block 226 shows the word "e" being associated with a count of 2. Block 228 shows that the word "b" is the trailing word of a bigram, (e,b), associated with a count of 1. Block 230 shows that the word "f" is the trailing word of a bigram, (e,f), associated with a count of 1. Block 232 shows the word "f" being associated with a count of 2. Block 234 shows that the word "d" is the trailing word of a bigram, (f,d), associated with a count of 1. Block 236 shows that the word "e" is the trailing word of a bigram, (f,e), associated with a count of 1.

In this example, mutual information (MI) is defined as follows:

$$MI(x, y) = p(x, y) \log\left(\frac{p(x, y)}{p(x)p(y)}\right),$$

where p(x,y), p(x) and p(y) are computed from the trie and (x,y) is a bigram in the trie. For example, when computing MI(c,d) with the above example trie, p(c)=3/15=1/5, p(d)=3/15=1/5, and p(c,d)=p(d|c)*p(c)=2/3*1/5=2/15. As a result, $$MI(c, d) = p(c, d) \log\left(\frac{p(a, d)}{p(a)p(d)}\right)$$

or $$MI(c, d) = \frac{2}{15} \log\left(\frac{2/15}{1/15}\right) = 0.1605.$$

In this exemplary embodiment, the system creates a new word xy when MI(x,y)>T1 and count(x,y)>T2. In one embodiment, bigrams are analyzed against these threshold conditions in descending order based on the bigrams' mutual information value; however, bigrams can be analyzed in any suitable order. T1 and T2 can be any suitable values (e.g., T1=0.16 and T2=1). Further, T1 and/or T2 can be adjusted by a user to adjust how new words are detected and/or added to the language unit. In another embodiment, the system uses a neural network instead of or in addition to threshold values to determine when creation of a new word is appropriate.

In the exemplary embodiment, the system updates the short-term n-gram store when a new word is created. For example, the system could determine that the bigram (c,d) had the top MI value and passed both the T1 and T2 threshold tests. The system will then create a new word, 'cd'. The system also updates the short-term n-gram store to reflect this change (i.e., the new word) while also transferring information to new bigrams involving the 'cd' word. In this example, the system analyzes, and possibly updates, the bigrams for (x, c), (c, y), (d, z), where x, y and z stand for any word that matches a bigram. The system may also add new bigrams containing the new word 'cd'. For example, any bigram (x, c) could now generate bigrams (x, cd) and any bigram (d, z) could generate new bigrams (cd, z). More specifically to this example, those bigrams are: (a, c), (b, c), (c, a), (c, d), (d, b), (d, e) as well as new bigrams (a, cd), (b, cd), (cd, b) and (cd, e).

Figure 3:
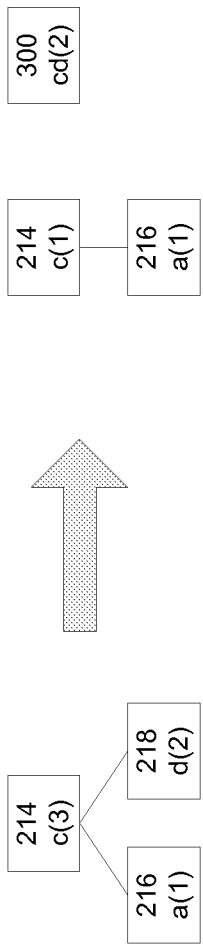
FIG. 3 is a block diagram illustrating the new word, "cd" being created and new count values being associated with the words "cd" and "c" in accordance with one embodiment.

In one embodiment, a processor is configured to associate a first count with the new word and to associate a second count with the first chunk. The second count is the count associated with the first chunk minus the first count. With reference to the above example, FIG. 3 illustrates the new word, "cd" being created and new count values being associated with the words "cd" and "c". Specifically, block 218 is removed from block 214. In its place, block 300 indicates that the new word "cd" is associated with a count of 2. Further, block 214 is modified to indicate that the word "c" is associated with a count of 1.

To transfer information to new bigrams including the word "cd", the system of one embodiment implements bigram interpolation. In one embodiment, a processor is configured to implement bigram interpolation by determining a set of bigrams. Each member of the set of bigrams includes the first chunk (or word) used to form the new word (e.g., "c") as a trailing word. The processor is also configured to compute a delta value for each member of the set of bigrams. The delta value is a first count minus a second count. The first count is associated with the member of the set associated with the delta value. The second count is a third count minus a fourth count. The third count is associated with the first chunk used to form the new word (e.g., "c"). The fourth count is associated with a first bigram. The first bigram includes the first chunk as a leading word as well as the second chunk used to form the new word (e.g., "d"). The processor is also configured to, when the delta value associated with a first member of the set of bigrams is positive, associate a fifth count with the first member and to associate a sixth count with a new bigram. The new bigram has the same leading word as the first member. The new bigram also has the new word. The fifth count is the count associated with the bigram associated with the delta value minus the delta value plus a proportional adjustment. The proportional adjustment is the multiplicative inverse of the third count multiplied by the delta value multiplied by the difference between the third count and the fourth count. The sixth count is the delta value multiplied by the difference between one and the proportional adjustment.

Bigram interpolation is further illustrated using the above example. One result of the interpolation is some "amount of count" can be transferred from one bigram to a new bigram (i.e., containing the new word 'cd').

Figure 4A:
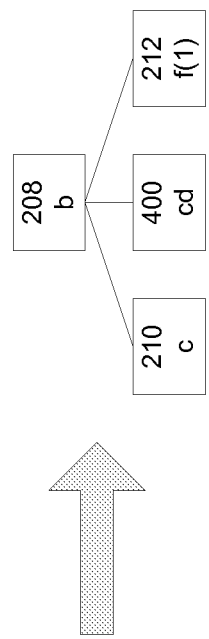
FIG. 4A is a block diagram illustrating the extension of a portion of the trie of FIG. 2 to represent the addition of new bigram (b, cd) in accordance with one embodiment.
Figure 4A:
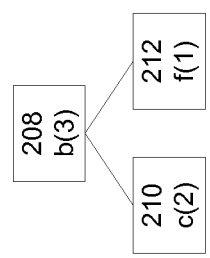

The bigram (b,c) includes the word "c" as the trailing word, and is therefore a member of the set described above with respect to this example. FIG. 4A illustrates the extension of block 208 to represent the addition of new bigram (b, cd). Specifically, block 400 is added to show the bigram (b, cd). Further, the new counts associated with blocks 208, 210 and 400 are not yet determined, but the count associated with block 212 is not affected.

To determine the new counts, the system calculates a delta value. Specifically, the number of counts A that must have been the sequence (b, c, d) as calculated as $\Delta$=count(b,c)−count(c,$\overline{d}$), or the count associated with bigram (b,c) minus the sum of counts associated with bigrams that begin with c but do not end with d. This delta value can be rewritten as $\Delta$=count(b,c)−[count(c)−count(c,d)]. In the present example, this evaluates to $\Delta$=2−[3−2]=1.

Because this delta value is positive, the delta value is removed from the previous count of the bigram (b,c), resulting in the bigram (b,c) temporarily being associated with a count of 1. It should be understood that this step can be combined with others in various embodiments, which could result in the bigram (b,c) not being temporarily associated with a count of 1.

The removed delta value of count (in this example, 1) is distributed in proportion to:

$$p(c) = \frac{count(a) - count(a, d)}{count(d)} = \frac{3-2}{3} = \frac{1}{3}$$

and $$p(c, d) = \frac{count(c, d)}{count(c)} = \frac{2}{3}.$$

Figure 4B:
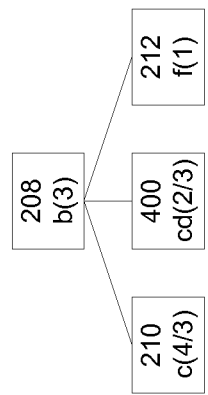
FIG. 4B is a block diagram illustrating the extension of a portion of the trie of FIG. 2 to represent the addition of new bigram (b, cd) with revised and new associated count values in accordance with one embodiment.
Figure 4B:
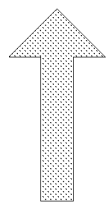
Figure 4B:
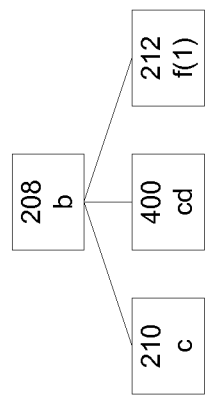

As a result, the count associated with bigram (b,c) is increased by 1/3*$\Delta$ and (b,cd) is increased (from 0) to 2/3*$\Delta$. Further, the count associated with word "b" can be recomputed from its children nodes. The resulting counts are illustrated in FIG. 4B, showing block 208 being associated with a count of 3, block 210 being associated with a count of 4/3 and block 400 being associated with a count of 2/3.

In one embodiment, final updating or storing of the counts is executed only once all count updates have been found and computed. In other embodiments, final updating or storing of new counts can be executed at any suitable time.

The bigram (a,c) also includes the word "c" as the trailing word, and is therefore a member of the set described above with respect to this example. A delta value is computed to determine the number of counts A that must have been the sequence (a, c, d). Specifically, $\Delta$=count(a,c)−count(c,$\overline{d}$) or $\Delta$=count(a,c)−[count(c)−count(c,d)], simialr to the digram (b,c) discussed above. However, in this specific instance, $\Delta$=1−[3−2]=0. Because the delta value is not positive, in the exemplary embodiment, it is determined that there is no amount of count that must have been in the sequence (a, c, d). As a result, the system does not create an alternate sub-graph and blocks 202, 204 and 206 remain as depicted in FIG. 2.

To transfer information to new bigrams including the word "cd", the system of one embodiment implements bigram extrapolation. In one embodiment, a processor is configured to determine a set of bigrams. Each member of the set includes the second chunk used to form the new word (e.g., "d") as a leading word. The processor is also configured to compute a delta value for each member of the set. The delta value is a first count minus a second count. The first count is associated with a first bigram. The first bigram includes the first chunk used to form the new word (e.g., "c") as a leading word and also includes the second chunk (e.g., "d"). The second count is a third count minus a fourth count. The third count is associated with the second chunk. The fourth count is associated with the member of the set. The processor is also configured to, when the delta value associated with a first member of the set of bigrams is positive, associate a fifth count with the first member and to associate a sixth count with a new bigram. The new bigram has the same trailing word as the first member. The new bigram also has the new word. The fifth count is the first count minus the delta value plus a proportional adjustment. The proportional adjustment is the delta value multiplied by the first count multiplied by the multiplicative inverse of the sum of first count and the third count. The sixth count is the delta value multiplied by the difference between one and the proportional adjustment.

Bigram extrapolation is further illustrated using the above example. One result of bigram extrapolation is the transfer of some "amount of count" from one bigram to the new bigram (e.g., containing the new word 'cd').

The bigram (d,b) includes the word "d" as the leading word, and is therefore a member of the set described above with respect to this example. The system computes a delta value representing the number of counts that must have been the sequence (c, d, b) as $\Delta=\text{count}(c,d)-\text{count}(d,\overline{b})$ or $\Delta=\text{count}(c,d)-[\text{count}(d)-\text{count}(d,b)]$. In this example, the delta value evaluates to $\Delta=2-[3-1]=0$. Because the delta value is not positive, there is no amount of count that must have been in the sequence (c, d, b). As a result, the system does not create the bigram (cd, b).

The bigram (d,e) includes the word "d" as the leading word, and is therefore also a member of the set described above with respect to this example. The system computes a delta value representing the number of counts that must have been the sequence (c, d, e) as $\Delta=\text{count}(c,d)-\text{count}(d,\overline{e})$ or $\Delta=\text{count}(c,d)-[\text{count}(d)-\text{count}(d,e)]$. In this example, the delta value evaluates to $\Delta=2-[3-2]=1$.

Because this delta value is positive, the delta value is removed from the previous count of the bigram (d,e), resulting in the bigram (d,e) temporarily being associated with a count of 1. It should be understood that this step can be combined with others in various embodiments, which could result in the bigram (d,e) not being temporarily associated with a count of 1.

The system then computes new counts for the bigrams (d,e) and (cd, e), specifically, by distributing the removed delta value of count (e.g., 1) between the bigrams (d,e) and (cd,e) in proportion to:

$$p(c, d, e) = \frac{\text{count}(c, d)}{\text{count}(c, d) + \text{count}(d)} = \frac{2}{2+3} = \frac{2}{5}$$

and $$p(d, e) = \frac{\text{count}(d)}{\text{count}(c, d) + \text{count}(d)} = \frac{3}{5}.$$

Figure 5:
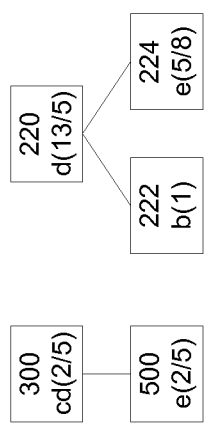
FIG. 5 is a block diagram illustrating bigram extrapolation in accordance with one embodiment.

As a result, the count associated with the bigram (d, e) is increased from its temporary value (i.e., 1) by $3/5*\Delta$ and the count associated with the new bigram (cd, e) is increased (from 0) by $2/5*\Delta$. Further, the new counts associated with the new word "cd" and the word "d" can be recomputed from their children nodes, as is shown in FIG. 5. Block 500 is attached to block 300 to represent the bigram (cd,e) being associated with a count of 2/5. Further, new word "cd" is also shown associated with a count of 2/5 by block 300. Block 224 now shows the bigram (d,e) being associated with a count of 8/5, and block 220 now shows the word "d" being associated with a count of 13/5.

Figure 6:
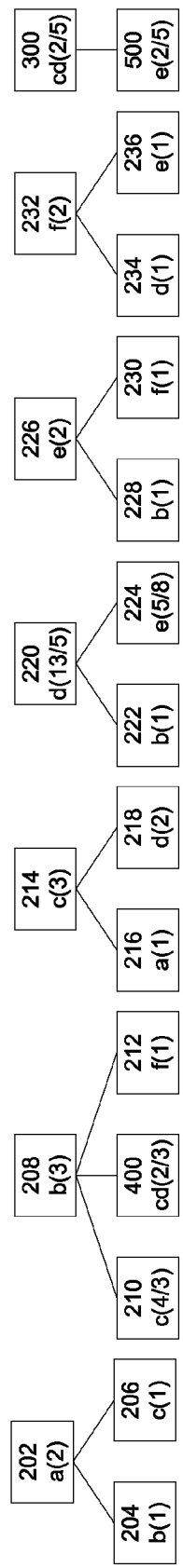
FIG. 6 is a block diagram of the trie of the short-term n-gram store of FIG. 2 after being modified to include a new word in accordance with one embodiment.

Once the new words, new bigrams and revised or new count values are calculated, the new values can be saved to the n-gram store in place of the old values. FIG. 6 illustrates the trie of the short-term n-gram store of FIG. 2 after the addition of the word "cd" and resulting new bigrams and count changes.

In one embodiment, updating the n-gram store is accomplished by logging each operation while computing the updates and calling methods such as AddBigram(x, y, count), DeleteBigram(x, y) and UpdateBigram(x, y, count) at the end of the procedure; however, updating the n-gram store can be accomplished in any suitable manner in various other embodiments. It should be noted that the addition of new words to the n-gram store can include adding the new words to a user-specific lexicon (e.g., a separate harvested user lexicon or a standard lexicon modified in response to user information) in various embodiments.

As the example embodiment discussed above operates, an arbitrary number of segments that commonly occur in sequence can be combined over one or more iterations of new word addition to form a new word. Thus, if the user commonly inputs a phrase such as "Microsoft makes my life better", the individual words (e.g., "Microsoft", "makes", "my", "life" and "better") can be combined into a single word: "Microsoft makes my life better". Alternatively, if a user commonly inputs a word that is outside of a language dictionary (e.g., "epitope"), individual letters can be combined until that word is added to the language unit.

Figure 7:
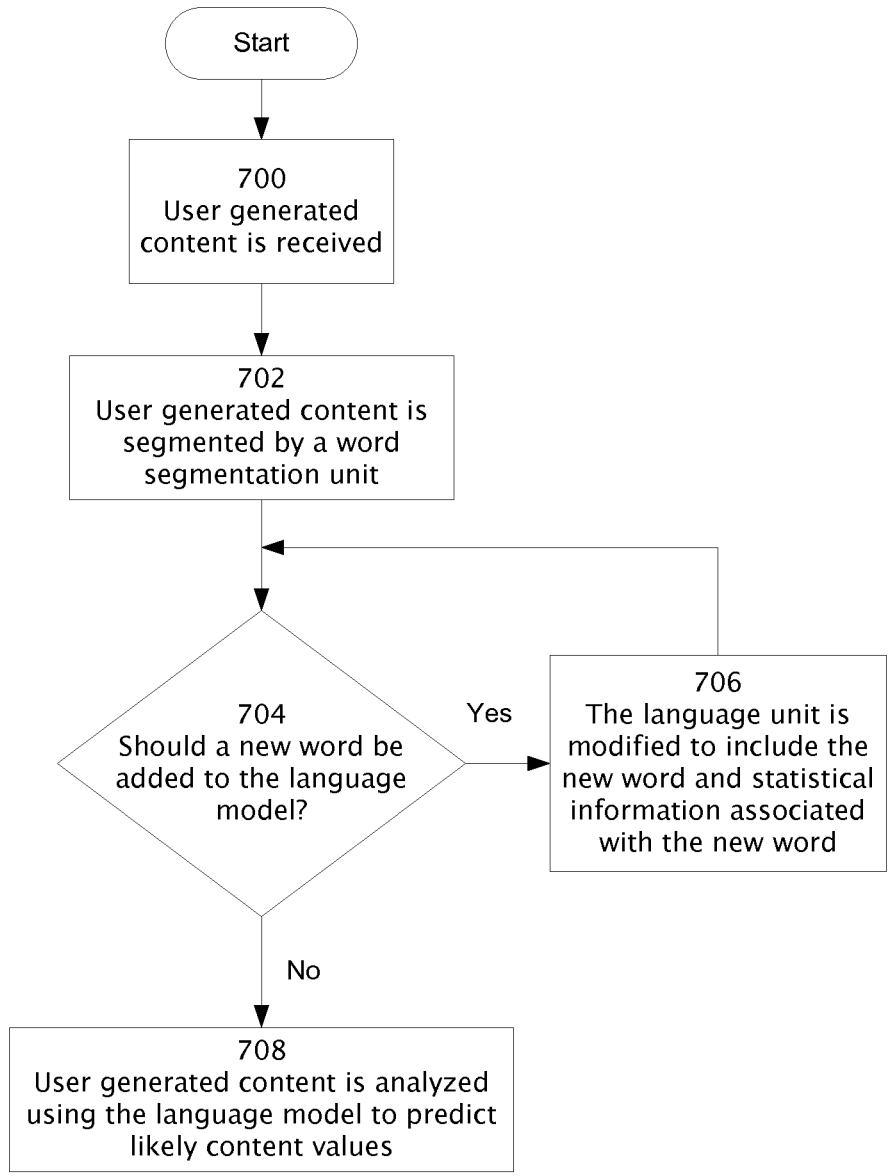
FIG. 7 is a flow diagram of a process of predicting user text in accordance with one embodiment.

FIG. 7 illustrates the process of predicting user text in accordance with one embodiment. At block 700, user generated content is received. The user generated content can be any suitable content associated with the user, including but not limited to text, writing, drawing, or speech entered by the user, e-mail, voice mail or any other suitable communications received or sent by the user, web pages or any other information sources visited by the user or otherwise caused to be analyzed by the user, or input actions made by the user using any suitable input device such as a mouse, stylus, touch screen, microphone, camera, video recorder or video camera.

At block 702, the user generated content is segmented (e.g., into chunks, words, or any other suitable segmentation unit) by a word segmentation unit. The word segmentation unit can use a language model maintained by a language unit to improve the segmentation performance.

At block 704, it is determined whether a new word should be added to the language model. This determination can be made by analyzing the segmented content and language model as described for any of the above embodiments or in any other suitable manner. If it is determined that a new word should be added, at block 706, the language unit is modified to include the new word and statistical information associated with the new word and the process repeats at step 704. The statistical information can be computed in any suitable manner, including those described for any of the above embodiments.

If it is determined that no new word should be added to the language model, at block 708, user generated content is analyzed using the language model to predict likely content values. For example, the system can display one or more predictions of what the user is currently entering. A user could then select one of the predictions in any suitable manner to enter the predicted content instead of slowly entering the content in the traditional manner. As a result, content entry can be made more rapidly and/or efficiently (e.g., with fewer typographical errors). Alternatively, the system can display one or more predictions of what the user was attempting to input when a possible input error is detected (e.g., a word that appears to be misspelled or grammatically incorrect). In another example, the system used the language model to predict and display to the user a correct outcome as part of a handwriting recognizer. It should be recognized that various steps of FIG. 7 can be performed in any suitable order, in parallel or not at all.

It should be understood that individual features and aspects discussed with respect to various embodiments above can also be included in any other suitable embodiments.

Exemplary Computing Environment

Figure 8:
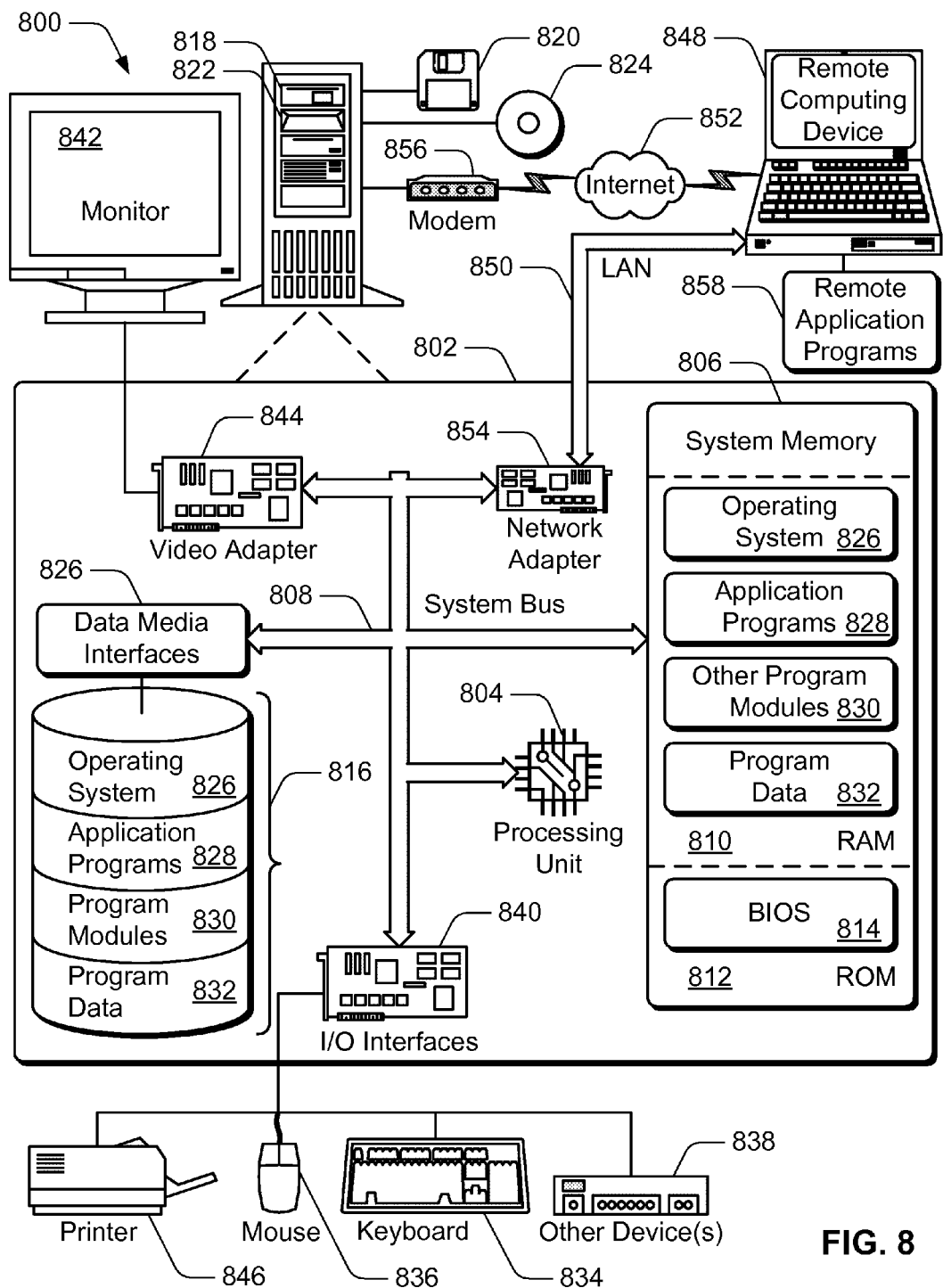
FIG. 8 is a block diagram of an exemplary computing environment in accordance with one embodiment.

FIG. 8 illustrates an exemplary computing environment 800 within which user interface transition systems and methods, as well as the computing, network, and system architectures described herein, can be either fully or partially implemented. Exemplary computing environment 800 is only one example of a computing system and is not intended to suggest any limitation as to the scope of use or functionality of the architectures. Neither should the computing environment 800 be interpreted as having any dependency or requirement relating to any one or combination of components illustrated in the exemplary computing environment 800.

The computer and network architectures in computing environment 800 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments, cell phones or other portable communications/data devices that include any of the above systems or devices, and the like.

The computing environment 800 includes a general-purpose computing system in the form of a computing device 802. The components of computing device 802 can include, but are not limited to, one or more processors 804 (e.g., any of microprocessors, controllers, and the like), a system memory 806, and a system bus 808 that couples the various system components. The one or more processors 804 process various computer executable instructions to control the operation of computing device 802 and to communicate with other electronic and computing devices. The system bus 808 represents any number of several types of bus structures, including a memory bus or memory controller, a peripheral bus, an accelerated graphics port, and a processor or local bus using any of a variety of bus architectures.

Computing environment 800 includes a variety of computer readable media which can be any media that is accessible by computing device 802 and includes both volatile and non-volatile media, removable and non-removable media. The system memory 806 includes computer-readable media in the form of volatile memory, such as random access memory (RAM) 810, and/or non-volatile memory, such as read only memory (ROM) 812. A basic input/output system (BIOS) 814 maintains the basic routines that facilitate information transfer between components within computing device 802, such as during start-up, and is stored in ROM 812. RAM 810 typically contains data and/or program modules that are immediately accessible to and/or presently operated on by one or more of the processors 804.

Computing device 802 may include other removable/non-removable, volatile/non-volatile computer storage media. By way of example, a hard disk drive 816 reads from and writes to a non-removable, non-volatile magnetic media (not shown), a magnetic disk drive 818 reads from and writes to a removable, non-volatile magnetic disk 820 (e.g., a "floppy disk"), and an optical disk drive 822 reads from and/or writes to a removable, non-volatile optical disk 824 such as a CD-ROM, digital versatile disk (DVD), or any other type of optical media. In this example, the hard disk drive 816, magnetic disk drive 818, and optical disk drive 822 are each connected to the system bus 808 by one or more data media interfaces 826. The disk drives and associated computer readable media provide non-volatile storage of computer readable instructions, data structures, program modules, and other data for computing device 802.

Any number of program modules can be stored on the hard disk 816, magnetic disk 820, optical disk 824, ROM 812, and/or RAM 810, including by way of example, an operating system 826, one or more application programs 828, other program modules 830, and program data 832. Each of such operating system 826, application programs 828, other program modules 830, and program data 832 (or some combination thereof) may include an embodiment of the systems and methods described herein.

Computing device 802 can include communication media. Communication media typically embodies computer readable instructions, data structures, program modules, or other data in a modulated data signal such as a carrier wave or other transport mechanism and includes any information delivery media. The term "modulated data signal" refers to a signal that has one or more of its characteristics set or changed in such a manner as to encode information in the signal. By way of example, and not limitation, communication media includes wired media such as a wired network or direct-wired connection, and wireless media such as acoustic, RF, infrared, other wireless media, and any combination thereof.

A user can interface with computing device 802 via any number of different input devices such as a keyboard 834 and pointing device 836 (e.g., a "mouse"). Other input devices 838 (not shown specifically) may include a microphone, joystick, game pad, controller, satellite dish, serial port, scanner, and/or the like. These and other input devices are connected to the processors 804 via input/output interfaces 840 that are coupled to the system bus 808, but may be connected by other interface and bus structures, such as a parallel port, game port, and/or a universal serial bus (USB).

A monitor 842 or other type of display device can be connected to the system bus 808 via an interface, such as a video adapter 844. In addition to the monitor 842, other output peripheral devices can include components such as speakers (not shown) and a printer 846 which can be connected to computing device 802 via the input/output interfaces 840.

Computing device 802 can operate in a networked environment using logical connections to one or more remote computers, such as a remote computing device 848. By way of example, the remote computing device 848 can be a personal computer, portable computer, a server, a router, a network computer, a peer device or other common network node, and the like. The remote computing device 848 is illustrated as a portable computer that can include many or all of the elements and features described herein relative to computing device 802.

Logical connections between computing device 802 and the remote computing device 848 are depicted as a local area network (LAN) 850 and a general wide area network (WAN) 852. Such networking environments are commonplace in offices, enterprise-wide computer networks, intranets, and the Internet. When implemented in a LAN networking environment, the computing device 802 is connected to a local network 850 via a network interface or adapter 854. When implemented in a WAN networking environment, the computing device 802 typically includes a modem 856 or other means for establishing communications over the wide area network 852. The modem 856, which can be internal or external to computing device 802, can be connected to the system bus 808 via the input/output interfaces 840 or other appropriate mechanisms. The illustrated network connections are exemplary and other means of establishing communication link(s) between the computing devices 802 and 848 can be utilized.

In a networked environment, such as that illustrated with computing environment 800, program modules depicted relative to the computing device 802, or portions thereof, may be stored in a remote memory storage device. By way of example, remote application programs 858 are maintained with a memory device of remote computing device 848. For purposes of illustration, application programs and other executable program components, such as the operating system 826, are illustrated herein as discrete blocks, although it is recognized that such programs and components reside at various times in different storage components of the computing device 802, and are executed by the processors 804 of the computing device.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method implemented by a device that executes a word building application, the method comprising:
   receiving, by the device, letters to initiate segmentation into a first letter set and a second letter set, each of the first and second letter sets comprising one or more of the letters;
   determining, by the device, a statistical relationship between the first letter set and the second letter set;
   determining, by the device, whether the statistical relationship satisfies a condition;
   responsive to satisfying the condition, adding, by the device, a word composed of the first letter set and the second letter set into a data store associated with the device containing one or more words and one or more bigrams, each of the words having associated count information and each of the bigrams composed of a leading data word and one or more trailing data words, each bigram configured to have associated count information;
   identifying, by the device, a first bigram from a set of bigrams in the data store, each bigram of the set including the first letter set as a trailing data word;
   transforming, by the device, a leading data word of the first bigram and the word into a new bigram to add to the data store associated with the device, the new bigram composed of:
   the leading data word of the first bigram as a leading data word of the new bigram and
   the word as a trailing data word of the new bigram,
   computing, by the device, updated count information for the new bigram using a proportional adjustment that describes a relationship between the word following the leading data word of the first bigram relative to the first letter set following the leading data word of the first bigram; and
   analyzing, by the device, received user generated content using the data store associated with the device to predict text associated with the user generated content.

2. A method as recited in claim 1, further comprising:
   associating a first count with the first letter set corresponding to the number of instances of the first letter set as the leading data word;
   associating a new count with the word corresponding to the number of instances the first letter set is the leading data word and the second letter set is the trailing data word; and
   responsive to adding the word into the data store, updating the first count with a value determined from subtracting the new count from the first count.

3. A method as recited in claim 1, further comprising:
   identifying count information for the first bigram of the set;
   determining a delta value for the first bigram of the set; and
   responsive to determining a positive delta value indicating a relationship between the first bigram of the set and the word, computing updated associated count information for the first bigram of the set.

4. A method as recited in claim 1, further comprising:
   identifying a second set of bigrams from the one or more bigrams in the data store, each bigram of the second set having the associated count information and including the second letter set as the leading data word;
   determining a delta value for a first bigram of the second set; and
   responsive to determining a positive delta value indicating a relationship between the first bigram of the second set and the word, computing updated associated count information for the first bigram of the second set.

5. A method as recited in claim 4, further comprising:
   creating a second new bigram, the second new bigram composed of
   the word as a leading data word of the second new bigram and
   a trailing data word of the first bigram of the set as a trailing data word of the second new bigram.

6. A method as recited in claim 4, wherein computing updated count information for the first bigram of the second set uses a proportional adjustment that describes a relationship between the word preceding the trailing data word of the first bigram relative to the second letter set preceding the trailing data word of the first bigram.

7. A method as recited in claim 1, wherein the leading data word is composed of:
    a respective letter set,
    a respective word, or
    a respective phrase.

8. A method as recited in claim 1, wherein the one or more trailing words are composed of:
    a respective letter set,
    a respective word, or
    a respective phrase.

9. A method as recited in claim 1, wherein to satisfy the condition further includes determining whether count information associated with the first letter set being followed by the second letter set is greater than a threshold value.

10. A method as recited in claim 1, wherein each bigram of the set of bigrams has associated count information.

11. A method as recited in claim 1, further comprising: displaying the predicted text.

12. A method as recited in claim 11, further comprising providing the new bigram to a text prediction application responsive to receiving an indication of user input.

13. A method as recited in claim 1, further comprising providing the updated count information to a text prediction application, a handwriting recognition application, and/or a spelling checker application.

14. A word building system, comprising:
    a device that includes at least a memory and a processor to implement a word building service that is configured to:
    receive letters to initiate segmentation into a first letter set and a second letter set, each of the first and second letter sets comprising one or more of the letters;
    determine a statistical relationship between the first letter set and the second letter set;
        determine whether the statistical relationship satisfies a condition;
    responsive to satisfying the condition, add a word composed of the first letter set and the second letter set into a data store associated with the device containing one or more words and one or more bigrams, each of the one or more words and one or more bigrams having associated count information, the one or more bigrams composed of a respective leading data word and one or more respective trailing data words;
    transform a leading data word of the first bigram and the word into a new bigram to add into the data store, the new bigram composed of:
        the leading data word of a first bigram as a leading data word of the new bigram; and
        the word as a trailing data word of the new bigram;
    compute updated count information for the new bigram using a proportional adjustment that describes a relationship between the word following the leading data word of the first bigram relative to the first letter set following the leading data word of the first bigram; and
    analyze received user generated content using the data store associated with the device to predict text associated with the user generated content.

15. A word building system as recited in claim 14, wherein the word building service is further configured to:
    associate a first count with the first letter set corresponding to the number of instances of the first letter set as the leading data word;
    associate a new count with the word corresponding to the number of instances the first letter set is the leading data word and the second letter set is the trailing data word; and
    responsive to adding the word into the data store, updating the first count with a value determined from subtracting the new count from the first count.

16. A word building system as recited in claim 14, wherein the word building service is further configured to:
    identify a set of bigrams from the one or more bigrams in the data store, each bigram of the set having the associated count information and including the first letter set as the trailing data word, the set including the first bigram;
    determine a delta value for the first bigram; and
    responsive to determining a positive delta value indicating a relationship between the first bigram and the word, compute updated associated count information for the first bigram.

17. A word building system as recited in claim 16, wherein the word building service is further configured to associate a new bigram count with the new bigram, the new bigram count computed using the delta value.

18. A word building system as recited in claim 14, wherein the word building service is further configured to:
    identify a second set of bigrams from the one or more bigrams in the data store, each bigram of the second set having the associated count information and including the second letter set as the leading data word;
    determine a delta value for a first bigram of the second set; and
    responsive to determining a positive delta value indicating a relationship between the first bigram of the second set and the word, compute updated associated count information for the first bigram of the second set.

19. A word building system as recited in claim 18, wherein the word building service is further configured to:
    create a second new bigram to add into the data store, the second new bigram composed of:
        the word as a leading data word of the second new bigram and
        a trailing data word of the first bigram of the set as a trailing data word of the second new bigram; and
    associate a new bigram count with the second new bigram, the new bigram count computed using the delta value.

20. A word building system as recited in claim 14, wherein to satisfy the condition further includes comparing whether count information associated with the first sequence of letters being followed by the second sequence of letters is greater than a threshold value.

21. One or more storage devices comprising instructions that, responsive to being executed by a computing system, cause the computing system to:
    receive letters to initiate segmentation into a first letter set and a second letter set, each of the first and second letter sets comprising one or more of the letters;
    determine a statistical relationship between the first letter set and the second letter set;
        determine whether the statistical relationship satisfies a condition;
    responsive to satisfying the condition, add a word composed of the first letter set and the second letter set into a data store containing one or more words and one or more bigrams, each of the one or more words and one or more bigrams having associated count information, each of the one or more bigrams composed of a leading data word and one or more trailing data words, the word configured to be interpolated with at least one of the one or more bigrams in the data store to transform the word and the at least one of the more or more bigrams into a new bigram, and compute updated count information for the new bigram using a proportional adjustment based at least in part on a relationship between the word following a leading data word or preceding a trailing data word of a respective bigram of the one or more bigrams; and analyze received user generated content using the data store to predict text associated with the user generated content.

22. One or more storage devices of claim 21, wherein the instructions further comprise instructions that cause the computing system to:

identify a set of bigrams from the one or more bigrams in the data store, each bigram of the set having the associated count information and including the first letter set as the trailing data word;

determine a delta value for a first bigram of the set;

responsive to determining a positive delta value indicating a relationship between the first bigram of the set and the word, compute updated associated count information for the first bigram of the set; and create the new bigram to add into the data store, the new bigram composed of:
a leading data word of the first bigram of the set as a leading data word of the new bigram and
the word as a trailing data word of the new bigram.

23. One or more storage devices of claim 21, wherein the instructions further comprise instructions that cause the computing system to:

identify a set of bigrams from the one or more bigrams in the data store, each bigram of the set having the associated count information and including the second letter set as the leading data word;

determine a delta value for a first bigram of the set;

responsive to determining a positive delta value indicating a relationship between the first bigram of the set and the word, compute updated associated count information for the first bigram of the set; and create the new bigram to add into the data store, the new bigram composed of:
the word as a leading data word of the new bigram and
a trailing data word of the first bigram of the set as a trailing data word of the new bigram.

* * * * *